United States Patent [19]

Ogura et al.

[11] Patent Number: 5,198,161
[45] Date of Patent: Mar. 30, 1993

[54] PARISON THICKNESS CONTROL METHOD

[75] Inventors: Masashi Ogura; Yutaka Saito; Masayuki Akimoto, all of Tochigi; Minoru Oizumi, Tokyo, all of Japan

[73] Assignees: Kao Corporation; Tahara Machinery Ltd., Tokyo, Japan

[21] Appl. No.: 664,823

[22] Filed: Mar. 5, 1991

[30] Foreign Application Priority Data

Mar. 7, 1990 [JP] Japan .................................. 2-55759
Mar. 13, 1990 [JP] Japan .................................. 2-62204

[51] Int. Cl.$^5$ .................... B29C 49/04; B29C 47/16; B29C 49/78
[52] U.S. Cl. .................... 264/40.5; 264/150; 264/151; 264/167; 264/541; 264/40.7; 364/473; 364/474.31; 364/577
[58] Field of Search .................... 264/40.5, 150, 40.7, 264/541, 151, 167, 40.1, 542; 425/141, 150, 466, 159, 326.1, 162, 532, 526, 381; 364/474.29, 474.31, 473, 577

[56] References Cited

U.S. PATENT DOCUMENTS

| | | | |
|---|---|---|---|
| 3,474,160 | 10/1969 | Doering | 425/326.1 |
| 3,865,528 | 2/1975 | Roess | 425/381 |
| 4,246,212 | 1/1981 | Upmeier et al. | 425/326.1 |
| 4,424,178 | 1/1984 | Daubenbüchel et al. | 264/40.1 |
| 4,663,726 | 5/1987 | Chand et al. | 364/474.31 |
| 4,774,540 | 12/1988 | Gutman et al. | 364/577 |
| 4,961,150 | 10/1990 | Seki et al. | 364/474.31 |
| 5,140,236 | 8/1992 | Kawamura et al. | 364/474.29 |

FOREIGN PATENT DOCUMENTS

| | | |
|---|---|---|
| 1934284 | 2/1971 | Fed. Rep. of Germany . |
| 63-82707 | 4/1988 | Japan . |
| 2221642 | 2/1990 | United Kingdom . |

Primary Examiner—Jeffery Thurlow
Assistant Examiner—Matheiu Vargot
Attorney, Agent, or Firm—Ronald P. Kananen

[57] ABSTRACT

A parison thickness control system includes an extruder die and a mandrel which are movable relative to each other to change wall thickness of a parison extruded between the extruder die and the mandrel during an extrusion or forming cycle of the parison. A parison control pattern is derived by manually inputting master points each defined in terms of a target parison wall thickness and an elapsed time during the parison extrusion cycle. A further parison control pattern is derived by performing the spline interpolation to interpolate between the master points. A still further parison control pattern is derived by correcting the above-noted further parison control pattern to allow the maximum or minimum value of the master points to indicate a limit value for the target parison wall thickness during the parison extrusion cycle. The parison extrusion cycle is divided into a given number of equal time intervals to define cycle points. The target parison wall thickness is derived for each cycle point based on the above-noted still further parison control pattern. The relative movement between the extruder die and the mandrel is controlled based on the derived target parison wall thickness for each cycle point. At least one of the cycle points may be used for triggering operation of an associated device.

6 Claims, 5 Drawing Sheets

PARISON THICKNESS CONTROL METHOD

BACKGROUND OF THE INVENTION

1. Field of the Invention

The invention relates generally to system and method for controlling thickness of parison walls for use with plastic molding machines. More specifically, the invention relates to a parison thickness control system and a method for use with parison extruders in plastic molding machines, which can control the wall thickness of the extruded parison as desired, and further control the operation timings of associated devices in synchronism with an extrusion or forming cycle of the parison.

2. Description of the Background Art

As is known, plastic is melted in the parison extruder and is forced through an annular opening defined between an extruder die and a mandrel in the form of a tube so as to be formed as a parison. Thickness of the parison walls is controlled according to a configuration and thickness of a finished product.

Figure 1:
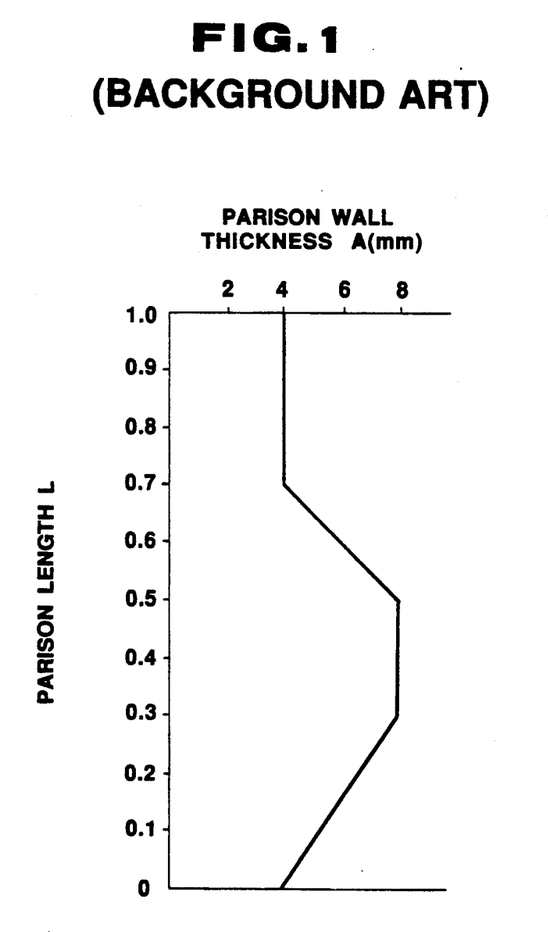
FIG. 1 is a graph showing a variation pattern of parison wall thickness in terms of parison length according to a background art.

Japanese Patent First (Unexamined) Publication (Tokkaisho) No. 63-82707 discloses one of the conventional parison thickness control systems. As shown in FIG. 1, a desired parison wall thickness A is defined over the entire length L of the parison in the form of a broken line, which data is stored in the memory unit. The system derives a target parison wall thickness A for a corresponding parison length per unit time during the parison extrusion or forming cycle based on the stored data using the method of interpolation, and adjusts an annular gap between the extruder die and a core of the mandrel according to a value of the derived target parison wall thickness A. The system sequentially derives a parison length which is to be extruded during the unit time based on the derived target parison wall thickness A and an extrusion amount of the melted plastic. The system further derives the accumulated parison length sequentially for deriving the corresponding target parison thickness A using the above-noted stored data and for detecting the termination of the parison extrusion cycle by comparing it with the stored entire parison length L. The termination of the parison extrusion cycle may also be detected by comparing an accumulated elapsed time with the stored entire parison extrusion cycle time.

In the foregoing background art, however, since variations in the target parison wall thickness are defined by the broken line, i.e. in the form of an angular pattern, when discontinuous points influence the finished product, ring lines are likely to be formed on the outer surface of the finished product at portions corresponding to angled portions of the broken line in FIG. 1, or unexpected uneveness of the thickness is likely to be generated in the finished product at the angled portions of the broken line, to weaken the structure of the finished product. In order to avoid this, it is necessary to make the wall thickness of the finished product unnecessarily thicker as a whole, which is disadvantageous in view of the cost.

Further, in the foregoing background art, the parison thickness control system can not control operations of other associated devices in the plastic molding machine in timed synchronism with the parison extrusion cycle. Specifically, in case of the continuous extrusion of the parison, the timed synchronism should be necessary between the parison extrusion cycle and the entire operation cycle of the plastic molding machine including, for example, the closing and opening of a mold having two mold halves, the cutting of the parison by a parison cutter and the transfer of the mold to another station.

SUMMARY OF THE INVENTION

Accordingly, it is an object of the present invention to provide a parison thickness control system and a method that can eliminate the above-noted defects inherent in the background art.

It is another object of the present invention to provide a parison thickness control system and a method that can provide a finished molded product with a smooth curved surface having no discontinuous portions, such as ring lines, and no unexpected uneveness in thickness so as to prevent the generation of the unexpectedly weakened portions in the finished product.

It is a further object of the present invention to provide a parison thickness control system and a method that can provide the above-noted finished product with an optimum wall thickness so as to make minimum quantities of plastic to used for molding the finished product.

It is still another object of the present invention to provide a parison thickness control system and a method that can control the operation timings of other associated devices in the plastic molding machine in synchronism with the parison extrusion or forming cycle.

To accomplish the above-mentioned and other objects, according to one aspect of the present invention, a parison thickness control system, which includes an extruder die and a mandrel, the extruder die and the mandrel being movable relative to each other to change wall thickness of a parison extruded between the extruder die and the mandrel during an extrusion cycle of the parison, comprises:

manual data input means for inputting a plurality of master points, each of the master points defined in terms of a target thickness of the parison and an elapsed time during the parison extrusion cycle;

first means for performing a spline interpolation so as to interpolate between the input master points to derive a first parison control pattern;

second means for correcting the first parison control pattern so as to allow the maximum or minimum value of the master points to indicate a limit value for the target thickness of the parison during the parison extrusion cycle for deriving a second parison control pattern;

third means for setting cycle points which divide the parison extrusion cycle into a predetermined number of equal time intervals;

fourth means for sequentially producing periodic signals at the equal time intervals;

fifth means for deriving the target thickness of the parison for a corresponding one of the cycle points based on the second parison control pattern at a timing of occurrence of each periodic signal;

driving means for effecting the relative movement between the extruder die and the mandrel based on the derived target thickness of the parison so as to provide a controlled wall thickness distribution of the parison during the parison extrusion cycle.

According to another aspect of the present invention, a parison thickness control method in which a gap defined between a die and a mandrel is adjusted by a gap adjusting means so as to control thickness of a parison extruded through the gap, comprises the steps of:

defining a parison forming time and a target parison thickness value on two axes intersecting in perpendicular to each other;

setting master points at a plurality of points which are determined by considering a thickness variation of the parison;

forming a pattern by interpolating between the master points using a method of spline interpolation and further by interpolating to make the maximum or minimum value of the master points a limit value;

setting cycle points which divide a parison forming cycle time into a predetermined number of equal time intervals;

deriving a target parison thickness value for a corresponding parison forming time per each of the cycle points using the pattern; and controlling a position of the mandrel so as to provide the derived target parison thickness value.

According to a further aspect of the present invention, a parison thickness control method in which a gap defined between a die and a mandrel is adjusted by a gap adjusting means so as to control thickness of a parison extruded through the gap, comprises the steps of:

forming a pattern by defining a parison forming time and a target parison thickness value on two axes intersecting in perpendicular to each other;

presetting positions of the mandrel corresponding to the target parison thickness value, and a parison forming cycle time;

setting cycle points which divide the parison forming cycle time into a predetermined number of equal time intervals;

controlling the position of the mandrel based on the target parison thickness value for each cycle point; and outputting an operation signal to an associated device constituting a part of the entire molding process of a product at least at one of the cycle points so as to provide timed synchronism between the parison forming and the product molding.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Referring now to the drawings, first and second preferred embodiments of parison wall thickness control system and method according to the present invention will be described with reference to FIGS. 2 to 6.

Figure 2:
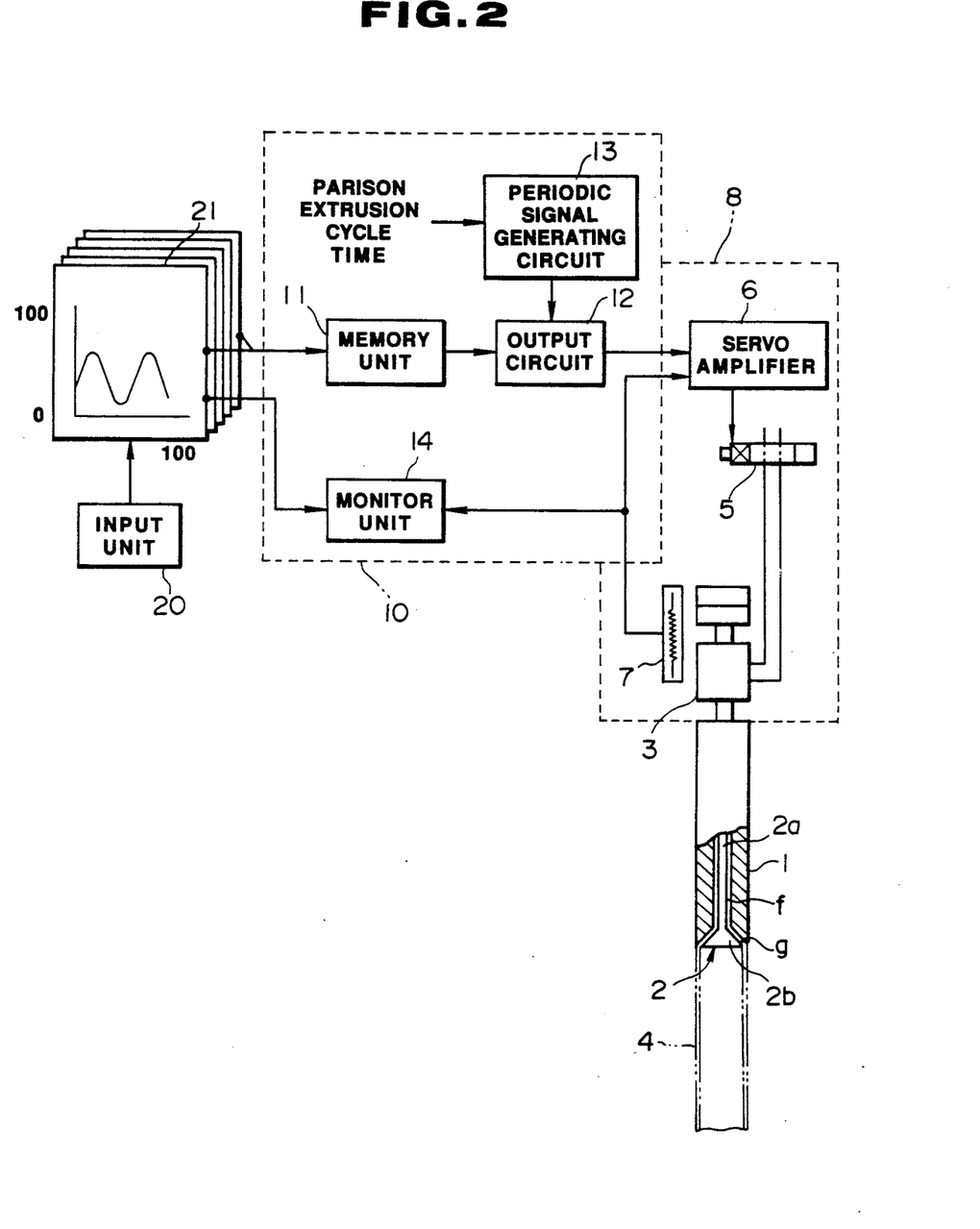
FIG. 2 is a diagram showing an entire structure of a parison thickness control system for explaining first and second preferred embodiments of the present invention.
Figure 6:
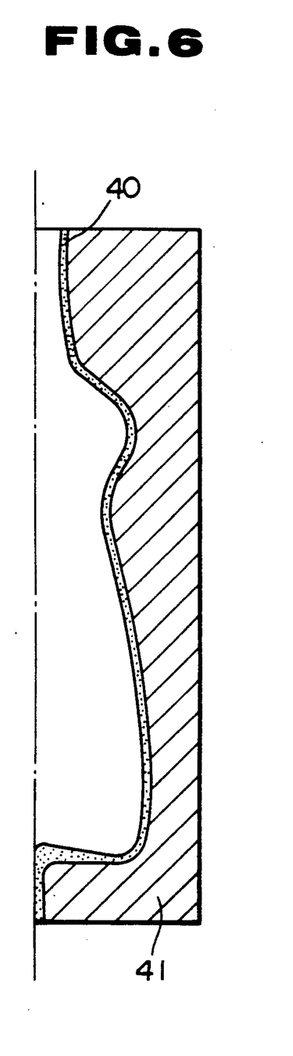
FIG. 6 is a schematic view showing the state of a finished product within a mold cavity, wherein the parison is blown with gas under pressure to expand into complete contact with the walls of the mold cavity.

FIG. 2 shows an entire structure of the parison wall thickness control system according to the first preferred embodiment. In FIG. 2, an extruder die has an opening which receives therein a mandrel 2. The mandrel 2 has a stem portion 2a and a core portion 2b having a conical shape. The stem portion 2a is mechanically connected to a hydraulic cylinder 3 at its upper end and is continuous with the core portion 2b at its lower end, so that a vertical position of the core portion 2b relative to the extruder die 1 is adjustable by the operation of the hydraulic cylinder 3. An annular flow passage f is formed between the stem portion 2a of the mandrel 2 and cylindrical walls of the extruder die opening, and an annular funnel-shaped flow passage or gap g is formed between the core portion 2b of the mandrel 2 and diverging walls of the extruder die opening. A melted plastic is introduced downward from a body of the parison extruder through the flow passages f and g so as to form a parison 4 which is introduced into a mold cavity of a mold having two mold halves and expands by means of introduced gas under pressure into complete contact with the walls of the mold cavity as shown in FIG. 6. A width of the flow passage or gap g is adjustable by changing the vertical position of the mandrel core portion 2b so as to adjust wall thickness of the extruded parison 4 as desired.

The operation of the hydraulic cylinder 3 is controlled by a hydraulic servo valve 5 which controls the application of pressurized fluid to the hydraulic cylinder 3 based on signals from a servo amplifier 6. The servo amplifier 6 receives a control signal from a machine controller which will be described later and a feedback signal indicative of the position of the mandrel 2 from a position sensor 7 such as a potentiometer, and feeds the signal to the hydraulic cylinder 3 in the form of an error signal indicative of a difference between the control signal and the feedback signal. The hydraulic cylinder 3, the hydraulic servo valve 5, the servo amplifier 6 and the position sensor 7 cooperatively constitute a flow width or gap adjusting means 8 which adjusts the width of the flow passage or gap g. The operation of the gap adjusting means 8 is controlled by the control signals from the machine controller 10.

The machine controller 10 includes a memory unit 11 which stores a parison control pattern representative of target parison wall thickness over the entire length of the extruded parison 4, and a periodic signal generating circuit 13 which outputs a predetermined number N of signals during a parison extrusion or forming cycle so as to divide the parison extrusion cycle into the number N of equal time intervals or increments. The occurrences of the periodic signals respectively correspond to cycle points which are set in the above-noted parison control pattern stored in the memory unit 11 and will be described later in detail. The machine controller 10 further includes an output circuit 12 which receives the periodic signals from the periodic signal generating circuit 13 and outputs the control signal to the servo amplifier 6 for every cycle point. The control signal is a positional signal indicative of a magnitude of stroke of the mandrel 2 or its core portion 2b. The magnitude of the mandrel stroke is derived based on the target parison wall thickness which is read out for every cycle point from the stored parison control pattern triggered by the periodic signal. The machine controller further includes a monitor unit 14 which receives the feedback signal from the position sensor 7 and a signal from a pattern monitor unit 21 to monitor the actual controlled state of, for example, the movement of the mandrel 2 or its core portion 2b.

A reference numeral 20 denotes a data input unit for manually inputting master points to provide a provisional parison control pattern representative of the target parison wall thickness in terms of parison forming times or parison extrusion elapsed times during the parison extrusion cycle. The pattern monitor unit 21 includes cathode ray tubes (CRT's) for displaying the above-noted parison control patterns when forming them and for displaying the controlling state for the parison extrusion.

In FIG. 6, a finished bottle product 40 is shown as being in the mold 41. Specifically, the extruded parison 4 is expanded by means of the introduced gas under pressure so as to provide complete contact with the walls of the mold cavity. For simplicity, only one mold half is shown in FIG. 6.

Figure 5:
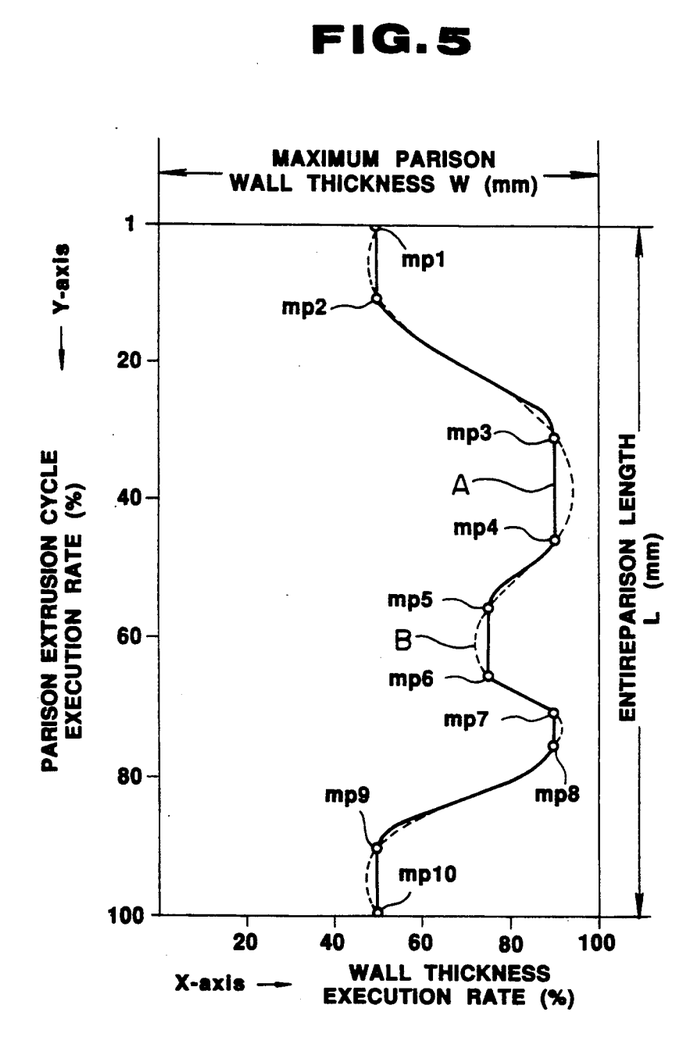
FIG. 5 is a graph showing a variation pattern of parison wall thickness over an entire length of an extruded parison according to the first and second preferred embodiments of the present invention.

FIG. 5 shows the parison control pattern derived according to the first preferred embodiment for molding the finished bottle product 40 as shown in FIG. 6. Specifically, the parison control pattern is defined by a target parison wall thickness on an X-axis and parison forming time or a parison extrusion elapsed time in the parison extrusion cycle on a Y-axis. In practice, as shown in FIG. 5, the Y-axis represents rate (%) of elapsed time relative to the entire parison extrusion cycle, i.e. the parison extrusion cycle executing rate (%), which corresponds to the overall length L of the extruded parison 4, and the X-axis represents rate (%) of target parison wall thickness relative to the maximum thickness w which can be provided with the mandrel at its adjustable lowermost position, i.e. The parison wall thickness executing rate (%).

The parison control pattern is formed considering the configuration and the required thickness of the finished product 40 and accordingly is variable depending on the characteristics of the finished product 40.

The parison control pattern is formed by first setting a plurality of the master points (ten master points in the preferred embodiments) mp1 to mp10 each corresponding to a portion of the extruded parison 4 where variation in the wall thickness is necessary. Again, the master points are variably set according to the characteristics of the finished product. The method of spline interpolation, which is well known, is performed to interpolate between the master points so as to derive a dotted line B. Subsequently, correction of the line B is performed such that when a curved line on which the maximum or minimum value of the master points is not a limit value, a correction is made to make zero an inclination of the line B at that maximum or minimum value of the master points. Further, when the adjacent target points in the Y-axis direction have the same target parison wall thickness, the correction is made to connect those adjacent target points by a straight line. In other words, by performing interpolation using the spline function with the maximum or minimum value of the master points being a limit value, the spline interpolation is corrected to derive a smooth curved line A indicated by a solid line.

In practice, a plurality of the parison control patterns defined by various lines A are prepared for corresponding finished products having different characteristics and are stored in the memory unit 11.

The parison control pattern defined by the line A is further processed so as to derive final matrix data to be used for controlling the parison wall thickness. Specifically, as described above, the cycle points are set which divide the parison extrusion cycle into the number N of the equal time intervals or increments. The parison extrusion cycle defines a time which is required for extruding an overall length L of the parison 4, i.e. a time from the cutting of the parison to the subsequent cutting of the parison. For example, when the parison extrusion cycle is divided into 100 equal time intervals, 100 cycle points are set for equal time intervals each of 1/100 time of the parison extrusion cycle, and a target parison wall thickness is derived for each cycle point using the parison control pattern defined by the line A and is stored in the memory unit 11 as the final matrix data.

Figure 3:
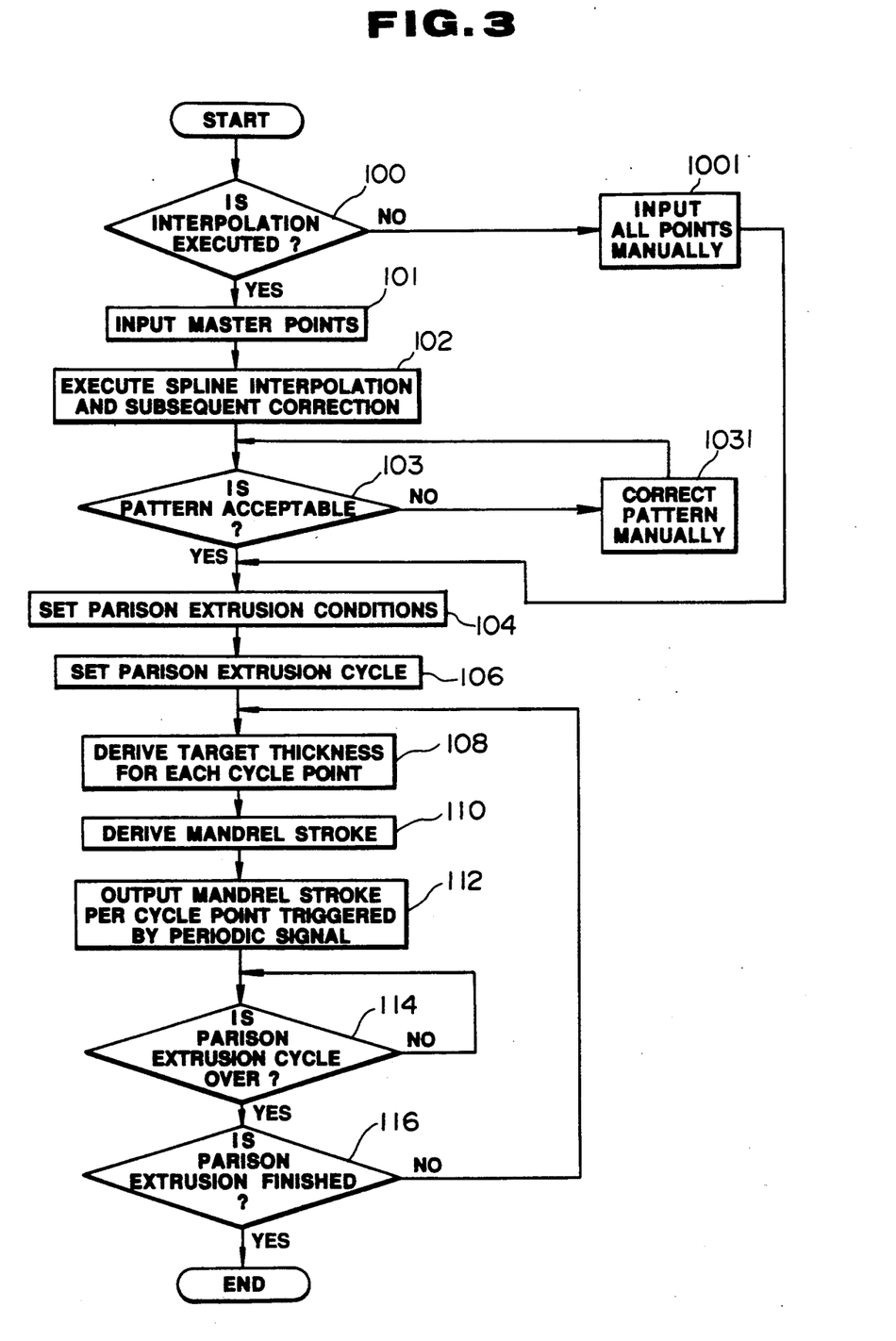
FIG. 3 is a flowchart to be executed by a machine controller for controlling wall thickness of an extruded parison over an entire length of the extruded parison, according to the first preferred embodiment of the present invention.

Now, operations of the machine controller 10 will be described hereinbelow with reference to a flowchart of FIG. 3. FIG. 3 shows the control flowchart to be executed in the machine controller 10. A desired parison control pattern is set either based on the interpolated line or by inputting all points manually, one of which is selected at a step 100.

At the first step 100, it is decided whether the parison control pattern is set based on the interpolated line. If answer at the step 100 is NO, then all necessary points are input manually at a step 1001. On the other hand, if answer at the step 100 is YES, then the master points mp1 to mp10 are input manually at a step 101 using the data input unit 20. At a subsequent step 102, the dotted line B as shown in FIG. 5 is first derived by the spline interpolation, and subsequently, the further interpolation or correction is performed to correct the maximum or minimum value of the master points to be a limit value so as to derive the line A which is a smooth curved line with no protruded portion. At a subsequent step 103, it is manually decided whether the parison control pattern derived at the step 102 is correct or desirable. If the answer at the step 103 is NO, i.e. modification is necessary to the derived parison control pattern, then the modification is performed manually using the data input unit 20. On the other hand, if the answer at the step 103 is YES, then the process goes to a step 104 where parison forming or extrusion conditions, such as a stroke of the mandrel 2 or its core portion 2b, are set, which stroke of the mandrel 2 provides the maximum parison wall thickness w, i.e. which stroke corresponds to the wall thickness execution rate being 100%. Subsequently, the parison extrusion or forming cycle time is set at the step 106.

The data derived at the step 102 or set at the step 1001, and set at the steps 104 and 106 are input into the pattern monitor unit 21 and stored in the memory unit 11.

Subsequently, at a step 108, a target parison wall thickness is derived for each cycle point, and then at a step 110, a corresponding stroke of the mandrel 2 or its core portion 2b is derived based on each target parison wall thickness derived at the step 108. Subsequently, at a step 112, the control signal indicative of the mandrel or core portion stroke derived at the step 110 is output from the output circuit 12 to the servo amplifier 6, triggered by the periodic signal from the periodic signal generating circuit 13, which periodic signal is generated at a timing corresponding to each cycle point and divides the entire parison extrusion cycle into the predetermined number N, i.e. 100 in the preferred embodiments. The servo amplifier 6 in turn controls the operation of the hydraulic cylinder 3 through the hydraulic servo valve 5 so as to adjust the position of the mandrel 2 or its core portion 2b corresponding to the control signal indicative of the mandrel or core portion stroke. Specifically, the position of the mandrel 2 or its core portion 2b is monitored by the position sensor 7 which feeds the feedback signal to the servo amplifier 6. The servo amplifier 6 outputs to the servo valve 5 an error signal indicative of a difference between the control signal and the feedback signal so as to adjust the position of the mandrel 2 or its core portion 2b corresponding to the control signal.

The feedback signal is simultaneously fed to the monitor unit 14 of the machine controller 10 for monitoring the actual behaviour of the mandrel 2 or its core portion 2b.

At a subsequent step 114, it is checked whether the parison extrusion or forming cycle time is over or passed. In practice, the parison extrusion cycle is started with the cycle point "zero" and is finished with the cycle point "N−1".

As appreciated from the foregoing description, by adjusting the width of the flow passage or gap g in the manner as noted above, the wall thickness pattern of the extruded parison 4 follows the solid line A as shown in FIG. 5. Accordingly, the finished product having no discontinuous portions, such as ring lines, and no unexpected unevenness in thickness can be molded with the optimum wall thickness.

It is to be appreciated that though the cycle points are set so as to divide the parison extrusion cycle into 100 of equal time intervals or increments, the number of the cycle points may be set greater, for example, at the number of 200, so that the wall thickness pattern of the extruded parison more precisely follows the solid line A in FIG. 5. Further, the number of the master points may also be set larger depending on the characteristics, such as the configuration and the required wall thickness, of the finished product.

It is to be further appreciated that the foregoing preferred embodiment makes it possible to modify or change a target parison wall thickness partially, i.e. at a desired portion of the parison. Still further, the foregoing preferred embodiment makes it possible to change only the entire parison extrusion cycle time if desired, so as to provide the corresponding wall thickness pattern of the parison. Further, in FIG. 3, though the process returns to the step 108 when the answer at the step 116 is NO, the process may return to the step 112 when forming a parison having the same configuration by storing the data derived at the steps 108 and 110.

Figure 4:
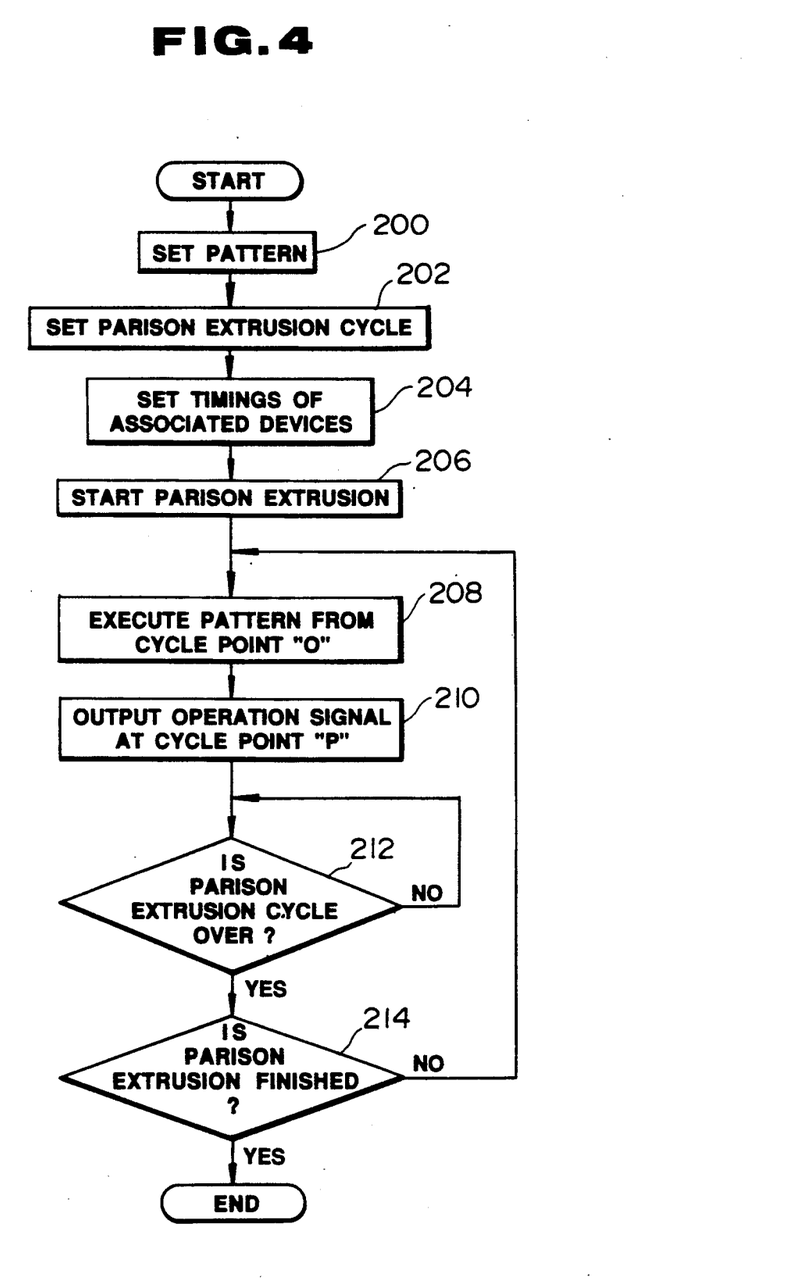
FIG. 4 is a flowchart to be executed for controlling operation timings between a parison extrusion or forming cycle and other associated devices in the plastic molding machine, according to the second preferred embodiment of the present invention.

Now, the second preferred embodiment of the present invention will be described with reference to FIG. 4. It is to be appreciated that the second preferred embodiment only differs from the first preferred embodiment in a flowchart as shown in FIG. 4 which is added to the first preferred embodiment. Accordingly, all the structure and features of the first preferred embodiment are employed in the second preferred embodiment.

The parison 4 extruded through the flow passages f and g in the first preferred embodiment is sequentially cut at a predetermined constant length L by a parison cutter (not shown) to be transferred, being held in the mold cavity, to a next station, such as a blow station, to be expanded into complete contact with the walls of the mold cavity so as to be formed into the finished mold product. Accordingly, for sequentially molding the finished products, the parison extrusion cycle should be in timed synchronism with the operations of the other associated devices, such as, the closing of the mold, the cutting of the parison by the parison cutter, and the transfer of the mold to the next station. The setting of the timings among the above-noted operations is quite important for preventing dislocation of the wall thickness variation so as to ensure the extruded parison having a desired (uniform) wall thickness distribution, which leads to the finished product having a desired wall thickness pattern.

In order to ensure the timed synchronism among the associated operations in the entire plastic mold machine, in the second preferred embodiment, operation signals are fed to the associated devices at timings of predetermined cycle points, which will be described hereinbelow with reference to the flowchart as shown in FIG. 4.

In FIG. 4, as in the first preferred embodiment, the parison control pattern is determined at a first step 200, and the parison extrusion cycle time is set at a subsequent step 202. Subsequently, at a step 204, the operation timings, such as the mold closing, the cutting of the parison by the parison cutter, and the transfer of the mold to the next station, are respectively set in sychronism with the corresponding cycle points. In this preferred embodiment, each of the above-noted timings is set at a corresponding one of 100 cycle points.

Subsequently, the parison extrusion is started at a step 206. The parison wall thickness control is executed from the cycle point "zero" at a subsequent step 208. When the counted number of the cycle points reaches the preset cycle point P, then the operation signal is output to the corresponding device to start the operation thereof, at a step 210.

Specifically, assuming that the parison extrusion cycle time is T(sec), the cycle point for starting the operation of a predetermined device is set to the number P, a total number of the cycle points is set to N, and a required time from the cycle point "zero" to the preset cycle point P is t(sec), the following equation is derived:

$$t = T \times P/N$$

Accordingly, further assuming that N is 100, T is 5(sec) and P is 40, t becomes 2(sec). This means that a corresponding associated device is operated 2(sec) after the start of the parison extrusion at the step 206. In practice, the number of the cycle points, i.e. of the periodic signals are counted by a counter from a time point of the start of the parison extrusion so that the corresponding associated device is operated when a counter value reaches the number P. The termination of the preset parison extrusion cycle time is detected at a step 212 when the number of the cycle point, i.e. The counter value reaches the number 99 counting from the number "zero", and subsequently, when the counter value reaches 99, the process goes to a step 214 which checks whether the parison extrusion is finished. If the answer at the step 214 is NO, i.e. The parison extrusion is not yet finished, then the counter value is reset to zero, and the process returns to the step 208.

As appreciated from the foregoing second preferred embodiment, by sequentially executing the control processes as shown in FIGS. 3 and 4, the wall thickness pattern of the parison 4 extruded through the flow passages f and g precisely follows the solid line A as shown in FIG. 5. Further, since the operations of the associated devices are respectively in timed synchronism with the parison extrusion cycle, the dislocation of the parison wall thickness variation is effectively prevented to ensure the desired wall thickness distribution in the finished product.

It is to be appreciated that the number of the cycle points P is variably set depending on the characteristics of the corresponding associated device.

It is to be understood that this invention is not to be limited to the embodiment described above, and that various changes and modifications may be made without departing from the spirit and scope of the invention as defined in the appended claims.

For example, in the second preferred embodiment, the spline interpolation and the subsequent correction may be replaced with other method as long as a predetermined cycle point is used to control the operation of the associated device. Further, in the first and second preferred embodiments, though the mandrel or its core portion is designed to shift relative to the extruder die so as to vary the width of the flow passage or gap g, the extruder die may be alternatively shifted relative to the mandrel or its core portion so as to vary the width of the flow passage or gap g.

What is claimed is:

1. A parison thickness control method in which a gap defined between a die and a mandrel is adjusted by a gap adjusting means so as to control thickness of a parison extruded through said gap, comprising the steps of:

defining a parison forming time and a target parison thickness value on two axes intersecting in perpendicular to each other;

setting master points at a plurality of points which are determined by considering a thickness variation of the parison;

forming a smooth, curved pattern by interpolating between said master points using a method of spline interpolation and further by interpolating to make the maximum or minimum value of the master points a limit value to thereby obtain said smooth, curved pattern;

setting cycle points which divide a parison forming cycle time into a predetermined number of equal time intervals;

deriving a target parison thickness value for a corresponding parison forming time for each of said cycle points using said smooth, curved pattern; and controlling a position of said mandrel based on said derived target parison thickness value for each cycle point so as to provide a controlled thickness distribution for the parison during the parison forming cycle time.

2. The parison thickness control method as set forth in claim 1, further including the step of presetting positions of the mandrel corresponding to the target parison thickness value and a parison forming cycle time.

3. The parison thickness control method as set forth in claim 1 further including a step of outputting an operation signal to an associated device at least at one of said cycle points for triggering operation of said associated device so as to provide timed synchronism between the parison forming process and another process which is performed by said associated device.

4. The parison thickness control method as set forth in claim 1 wherein the step of controlling a position of said mandrel includes a step of monitoring a position of at least a portion of said mandrel by a position sensor and providing a feedback signal for producing an error signal when said feedback signal is different from a control signal controlling the position of said mandrel.

5. The parison thickness control method as set forth in claim 1 wherein the step of setting master points at a plurality of points is determined according to the configuration and required wall thickness of the finished product.

6. The parison thickness control method as set forth in claim 1, wherein the step of forming said pattern further includes a step of allowing target parison thickness values between the adjacent master points to be the same as the target parison thickness values of said adjacent master points when said target parison thickness values of the adjacent master points are identical.

* * * * *